Figure 1:
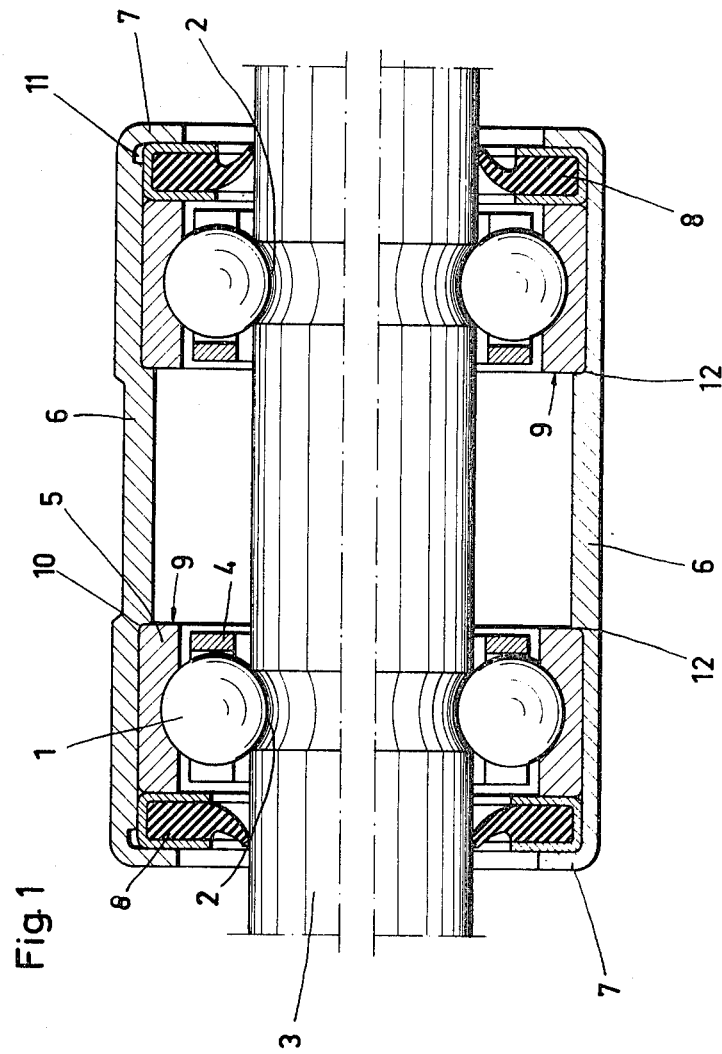

/ United States Patent                                                [15]   3,639,019
Schaeffler                                                           [45]   Feb. 1, 1972

[54] RADIAL BALL BEARINGS

[72] Inventor: Georg Schaeffler, Herzogenaurach, Germany

[73] Assignee: Industriewerk Schaeffler OHG, Herzogenaurach, Germany

[22] Filed: June 15, 1970

[21] Appl. No.: 45,979

[30] Foreign Application Priority Data

July 1, 1969 Germany.....................G 69 25 932.1
Aug. 22, 1969 Germany.....................G 69 33 092.3

[52] U.S. Cl. ..............................................................308/193
[51] Int. Cl. ..........................................................F16c 19/08
[58] Field of Search ..................................308/193, 195, 196

[56] References Cited

UNITED STATES PATENTS

| 1,280,620 | 10/1918 | Laycock | 308/196 |
| 1,375,112 | 4/1921 | Searles | 308/196 |
| 3,290,101 | 12/1966 | Recknagel | 308/187.1 |
| 3,206,829 | 9/1965 | Schaeffler et al. | 308/187.1 |

FOREIGN PATENTS OR APPLICATIONS

| 886,678 | 8/1953 | Germany | 308/189 |

*Primary Examiner*—Edgar W. Geoghegan
*Assistant Examiner*—Frank Susko
*Attorney*—Hammond & Littell

[57] ABSTRACT

A novel radial ball bearing particularly adapted for mounting a water pump shaft provided with two rows of balls spaced from each other and which roll in grooves in the shaft to be mounted.

7 Claims, 2 Drawing Figures

RADIAL BALL BEARINGS

STATE OF THE ART

Known radial ball bearings for mounting of shafts usually have two rows of balls rolling directly on grooves in the shaft and on grooves in a common massive outer race. This common outer race is produced by machining and is, therefor, expensive, particularly if additional slots or recesses have to be provided for the retention of sealing elements.

OBJECTS OF THE INVENTION

It is an object of the invention to provide radial ball bearings having excellent operating properties while being simply produced.

It is another object of the invention to provide a radial ball bearing for mounting a shaft provided with separate outer races for each row of balls, said races being joined by a thin-walled shell or housing.

These and other objects and advantages of the invention will become obvious from the following detailed description.

THE INVENTION

The radial ball bearing of the invention for mounting a shaft comprises two separate rows of balls spaced a distance from each other rolling in grooves in a shaft, a separate massive outer race provided with a ball groove for each row of balls, said outer races being joined together by a thin-walled housing produced without cutting. The said bearing is particularly adapted for mounting a shaft for a water pump.

The separate massive races are simply produced and there is no danger of undue distortion in tempering because of their small axial extension. The ball grooves in the outer races can be accurately cut and, therefore, guarantee for the longest life is given. In many cases, the outer races of presently available commercial ball bearings may be used and special production of the outer races may be avoided. The load capacity of the bearings of the invention is the same as bearings with a single massive outer race despite the presence of the thin-walled housing.

In a particularly advantageous embodiment of the invention, the outer races are formed by separately arranged halves of a massive outer race split in a radial plane. This has particularly great advantages in manufacturing if the outer races are not made separately but are the result of fracturing a massive outer race in a radial plane. A conventional massive outer race can, after finishing such as tempering and polishing, be split along a circular groove into two halves.

In a further embodiment of the invention, the separate massive races may be secured in an inwardly axial direction by providing each of the inner faces of the outer races with an abutment shoulder produced by noncutting formation or by projections of the thin-walled housing.

If the radial ball bearing of the invention is to be provided with a sealing means, the ends of the thin-walled housing are flanged over in a radially inward direction and a sealing means is inserted between the outer faces of the outer races and the flanged ends. In this manner, no slot or recess for the retention of the sealing means is required. The sealing means should be elastic in an axial direction to axially compensate for tolerances appearing in flanging of the ends of the thin-walled housing. If the outer races are formed by the two halves of a massive outer race split in a radial plane, an initial stress of race halves toward the rows of balls can be attained by axially elastic sealing means so that bearing may be made free of play.

If the outer races of the ball bearing of the invention consist of two race halves arranged on the interior side of the rows of balls, the race halves can be secured in an inward axial direction so that the inner faces of the race halves are supported or abut against the ends of a spacing element which is axially elastic. The race halves are prestressed towards the rows of balls by the axial elasticity of the spacing element so that the bearing can be made free of play. In one embodiment, the spacing element is axially secured relative to the thin-walled housing which securing can be done in known ways, such as by a notched pin or welding of the spacing element and housing.

In a radial bearing of the invention having the outer races formed by race halves arranged on the interior side of the rows of balls, the race halves can be axially secured toward the exterior by squeezing sealing means into the ends of the thin-walled housing until it contacts the outer face of the race half. The sealing element may be provided with a metal support and the portion of the sealing means near the race halves may be provided with recesses to supply space for lubricating greases.

Referring now to the drawings

Figure 2:
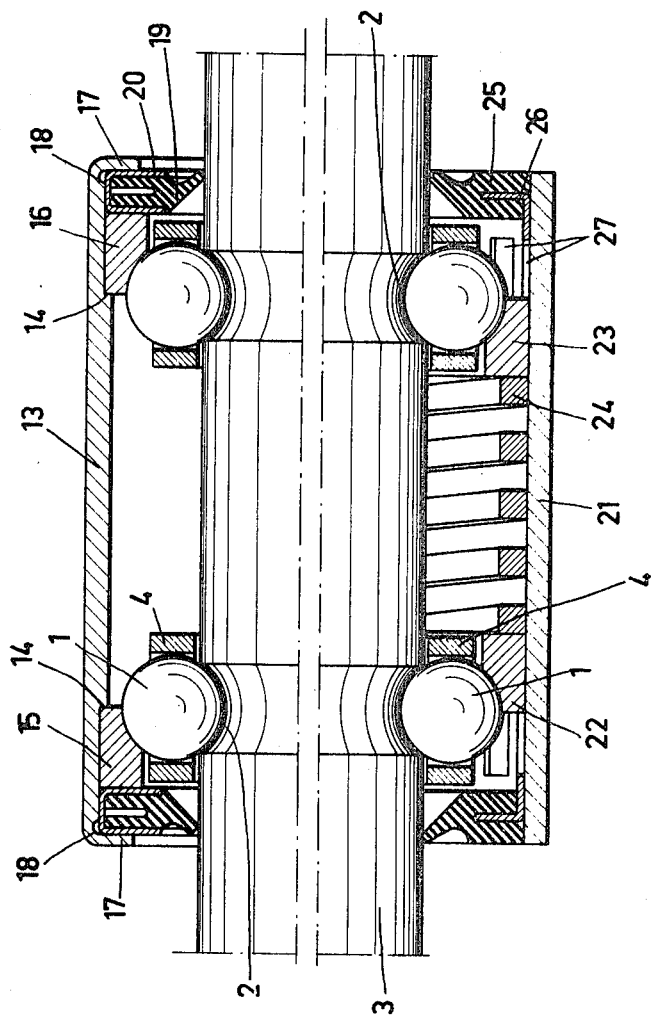

FIG. 1 is a cross-sectional view of one embodiment of the radial ball bearing of the invention, with separate outer races and the upper portion and lower portion of the drawing illustrate different shapes of the thin-walled outer housing; and FIG. 2 is a cross-sectional view of another embodiment of the invention with the outer races formed by separately arranged halves of a massive outer race split in a radial plane.

In the example of the radial ball bearing of FIG. 1, there is illustrated a water pump bearing having two series of spherical rolling bodies or balls 1 rolling in inner groves 2 machined in shaft 3. The balls 1 are seated in cages 4 and the separated outer races 5 are joined to each other by the thin-walled housing 6 provided with flanged ends 7 directed radially inward and which embrace the outer races 5. Sealing rings 8 are inserted between the external face of massive outer races 5 and the flanged ends 7 of the thin-walled housing 6.

The upper half of FIG. 1 illustrates a thin-walled housing 6 in which the opposite inner faces 9 of the massive outer race 5 are supported by shoulders 10 produced by diameter enlargement, without cutting, of housing 6 in the area of the outer races 5. The reduction 11, also formed without cutting, at flanged ends 7 acts to aid the bending over of the radially directed edge. The lower half of FIG. 1 illustrates the design in which shoulders 12 for the support of the outer race 5 are formed axially inwardly by a reduction, produced without cutting, of the wall thickness of the thin-walled housing 6. This form provides a radial ball bearing having a uniform outer diameter.

In the embodiment of FIG. 2, the massive outer race halves 15 and 16 are joined together by a thin-walled housing and the race halves can be separately manufactured or by cleaving a conventional outer race along a radial plane. In the upper half of FIG. 2, shoulders 14 are formed without cutting, axially toward the interior of the thin-walled housing 13 by reduction of the wall thickness of housing 13 in the area of race halves 15 and 16 which abut against the said shoulders. The ends of housing 13 are bent over to form radially inwardly directed flanges 17. A reduction 18 is formed without cutting in the wall thickness of housing 13 where the flanges are bent over to facilitate the bending. Seals consisting of elastic gaskets 19 provided with a sealing lip or edge are arranged between the exterior faces of the race halves and the flanges 17. The gasket 19 is embraced by U-shaped sheet metal element 20 for reinforcement. The sealing means is flexible in the axial direction to compensate for tolerances occurring in the bending over of flanges 17. This embodiment is particularly advantageous when the thin-walled housing 13 has to have a smooth bore without shoulders.

In the embodiment in the lower half of FIG. 2, the thin-walled housing 21 joining massive race halves 22 and 23 has a completely smooth inner and outer diameter. The race halves 22 and 23 are disposed on the interior side of the ball races and are axially supported on the inner side by spacing element 24 which is elastic in the axial direction. The elasticity of spacing element 24 can be effected by a coil spring construction as illustrated in FIG. 2 or by a material having a low modulus of elasticity such as a plastic. The radial ball bearing in the lower half of FIg. 2 is provided at each end with a pressed-on seal consisting of gasket 25 having a sealing lip and an L-shaped metal support 26. The sealing elements are pressed on until the metal element 26 contacts the exterior faces of the race halves 22 and 23. The axially directed leg of L-shaped element 26 is shaped like a comb to provide supply spaces 27 for holding lubricants.

Various modifications of the radial ball bearings of the invention may be made without departing from the spirit or scope thereof and it is to be understood that the invention is to be limited only as defined in the appended claims.

What is claimed is:

1. A radial ball bearing for mounting a water pump shaft comprising two separate rows of balls spaced a distance from each other rolling in grooves in a shaft, a separate massive outer race provided with a ball groove for each row of balls, said outer races being joined together by a thin-walled housing produced without cutting, and said outer races being halves of a massive outer race divided in a radial plane by fracturing of said massive outer race.

2. A ball bearing of claim 1 wherein the inner faces of the two outer races abut against a shoulder produced without cutting in the internal diameter of the thin-walled housing.

3. A radial ball bearing of claim 1 wherein the ends of the thin-walled housing are provided with radially inwardly directed flanges and a sealing means is provided between said flanges and the outer faces of the outer race.

4. A ball bearing of claim 3 wherein the sealing means is elastic in the axial direction.

5. A ball bearing of claim 2 wherein the race halves are arranged on the inner side of the rows of balls and the inner faces of the outer races abut against a spacing element which is axially elastic.

6. A ball bearing of claim 5 wherein the spacing element is axially fixed with respect to the thin-walled housing.

7. A ball bearing of claim 2 wherein the two race halves arranged on the inner side of the rows of balls and sealing elements are pressed onto the end of the thin-walled housing until they contact the outer faces of the race halves.

* * * * *